United States Patent [19]
Koning et al.

[11] Patent Number: 5,965,689
[45] Date of Patent: Oct. 12, 1999

[54] ELECTRICAL AND ELECTRONIC COMPONENTS MADE OF A POLYAMIDE COMPOSITION

[75] Inventors: Cornelis E. Koning, Schinnen; Petronella M. Knape, Sittard; Robert M. Leeuwendal, Maastricht; Josefina M. A. Schiffer, Vaals, all of Netherlands

[73] Assignee: DSM N.V., Heerlen, Netherlands

[21] Appl. No.: 09/044,133

[22] Filed: Mar. 19, 1998

Related U.S. Application Data

[63] Continuation of application No. PCT/NL96/00364, Sep. 18, 1996.

[30] Foreign Application Priority Data

Sep. 19, 1995 [BE] Belgium .................................. 9500768

[51] Int. Cl.[6] ............................ C08G 69/26; C08G 73/00
[52] U.S. Cl. .......................... 528/310; 528/313; 528/323; 528/331; 528/332; 528/335; 528/336; 428/901
[58] Field of Search ..................................... 528/332, 310, 528/335, 336, 323, 313, 331; 428/901

[56] References Cited

U.S. PATENT DOCUMENTS

| | | | |
|---|---|---|---|
| 3,950,310 | 4/1976 | Bouboulis | 528/310 |
| 4,398,012 | 8/1983 | Merrill et al. | 528/323 |
| 4,822,852 | 4/1989 | Wittmann et al. | 525/432 |
| 4,925,914 | 5/1990 | Dolden et al. | 528/336 |

*Primary Examiner*—P. Hampton-Hightower
*Attorney, Agent, or Firm*—Pillsbury, Madison & Sutro LLP

[57] ABSTRACT

The invention relates to electrical and electronic components made of a polyamide composition and possessing an improved resistance under soldering conditions, particularly when the surface mounting technique is used. This is achieved by using a polyamide composition whose main chain essentially consists of units derived from aliphatic dicarboxylic acids and diamines or $\alpha,\omega$-amino acids, and in which 1–40% of the chain units are derived from 1,6-cyclohexanedicarboxylic acid and an aliphatic diamine, or from 1,4-cyclohexanediamine and an aliphatic dicarboxylic acid.

As a result, the temperature at which blisters are formed during soldering by the infrared method is 20–30° C. higher than in the case of the homo-polyamide.

11 Claims, 1 Drawing Sheet

ELECTRICAL AND ELECTRONIC COMPONENTS MADE OF A POLYAMIDE COMPOSITION

RELATED APPLICATIONS

This is a continuation of International Application No. PCT/NL9600364, filed Sep. 18, 1996, which designated the U.S.

FIELD OF THE INVENTION

The present invention relates to electrical and electronic components made of a polyamide composition with an improved stability under soldering conditions.

BACKGROUND INFORMATION

The introduction of the surface mounting technique (SMT) makes it possible to put a large number of components on a circuit board, which is necessary partly because of the recent progress in the field of miniaturization and the improved performance of various apparatuses, and partly to ensure a further improvement in productivity. In the older techniques used for soldering components on a printed circuit board, pins attached to the components are pushed through holes in the circuit board. The ends of the pins are then brought into contact with a liquid solder, so that they become fixed in their position after cooling. In this method, the components themselves are not exposed to the high temperatures involved in the soldering process. In the surface mounting technique, on the other hand, the components are indeed exposed to these high temperatures.

This means that only polymers which have a melting temperature well above the temperature involved in the soldering operation, e.g. above 265° C., can be considered for use. This rules out some conventional plastics such as nylon-6, nylon-6,6, polyethylene terephthalate and polybutylene terephthalate. The problem with high-melting polymers such as polyphenylene sulphide (PPS) and aromatic polyamides, on the other hand, is that their mechanical characteristics or processing properties have certain limitations.

However, polytetramethyleneadipamide, an aliphatic polyamide-4,6 with a melting point of about 290° C., is much better in this respect, for it can be processed even if it has a very small wall thickness, and it exhibits good mechanical properties. No problems are encountered when electrical and electronic components made of this polyamide-4,6 are incorporated in circuits directly after production, i.e. in the "dry-as-moulded" state, with the aid of the surface mounting technique.

However, blisters can form on the polyamide component in a number of cases during soldering with the surface mounting technique if the polyamide component has been in contact with atmospheric air for a fairly long time so that it has absorbed some moisture from it, especially under tropical conditions. This is attributed to the high moisture absorption capacity of nylon-4,6, in turn caused by the large number of amide groups in the polyamide. To improve the situation, various attempts have been made to introduce a degree of hydrophobic character by admixing a polyphenylene sulphide or an aromatic polyester (see JP-A-3-263,461, JP-A-4-292,655 and JP-A-5-239,344). However, although this reduces the moisture uptake, it does not completely suppress the blister formation and it has an adverse effect on the mechanical and processing characteristics of the material.

SUMMARY AND OBJECT OF THE INVENTION

The aim of the present invention therefore is to provide an electrical or electronic component that is made of a linear polyamide and which is free from the problems mentioned above.

Quite surprisingly, it has now been found that, when only a small number of repeating units based either on 1,4-cyclohexanedicarboxylic acid and an aliphatic diamine or on 1,4-cyclohexanediamine and an aliphatic dicarboxylic acid are incorporated into the chain of an aliphatic polyamide, there is a great improvement in the SMT soldering properties of electrical and electronic components made from polyamide compositions with this polyamide, without the mechanical and processing characteristics being impaired.

It is also surprising that not only aliphatic polyamide-4,6 becomes easier to apply in this way but also any other linear polyamide whose melting point is raised sufficiently through incorporation of chain units based on 1,4-cyclohexanedicarboxylic acid or on 1,4-cyclohexanediamine to enable the material to withstand the SMT temperature, exhibits less blister formation. Such a polyamide is polyamide-6,6, for example. It should be added that the copolyamide formed between nylon-6,6 and hexamethyl-1,4-cyclohexyldiamide is known from an article published in J. Pol. Sc. A-1, 8 (1970) 3089–3111.

DETAILED DESCRIPTION OF THE INVENTION

Figure 1:
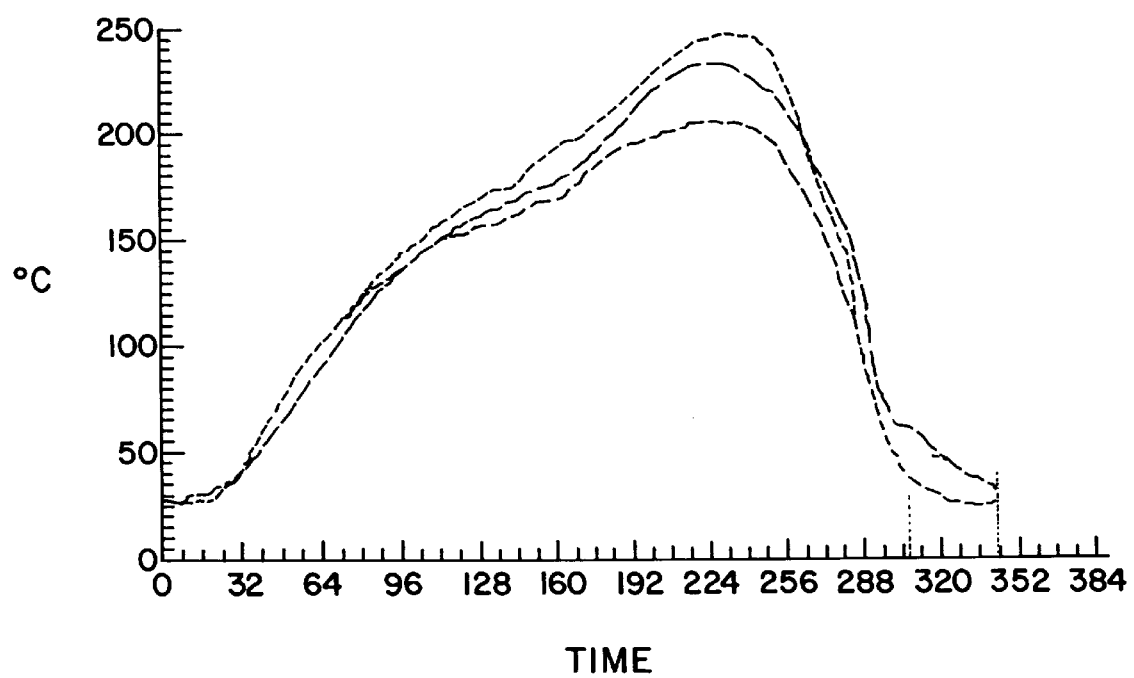

The polyamide composition for making electrical and electronic components according to the present invention contains a polyamide, 99–60% of whose main chain consists of units derived from aliphatic dicarboxylic acids and diamines or $\alpha,\omega$-amino acids, and is charact- terized in that 1–40% of the number of chain units is derived from 1,4-cyclohexanedicarboxylic acid and an aliphatic diamine, or else from 1,4-cyclohexanediamine and an aliphatic dicarboxylic acid.

Suitable aliphatic dicarboxylic acids are exemplified by dicarboxylic acids containing 1–16 and more preferably 2–10 methyl groups in the chain, most preferably adipic acid. The alkyl groups are preferably linear ones, but they can have a limited branching if e.g. the crystallization behaviour is not impaired by it too much.

Suitable aliphatic diamines are e.g. diamines with 2–16 and preferably 4–10 methyl groups in the chain, the most preferred compounds being 2-methylpentanediamine, 1,4-tetramethylenediamine and 1,6-hexamethylenediamine.

Suitable $\alpha,\omega$-amino acids are exemplified by those having 4–12 carbon atoms, such as 6-aminocaproic acid, 11-aminoundecanoic acid and 12-aminododecanoic acid.

The main chain is preferably built up predominantly of tetramethyleneadipamide or hexamethylene-adipamide units and units derived from pyrrolidone, 6-aminocaproic acid or $\epsilon$-caprolactam, aminoundecanoic acid or 12-aminododecanoic acid, or from a combination thereof.

The proportion of chain units derived either from 1,4-cyclohexanedicarboxylic acid and an aliphatic diamine or from 1,4-cyclohexanediamine and an aliphatic dicarboxylic acid is at least 1% and at most 40% of the total number of chain units. If their proportion is less than 1%, the effect on blistering is too small, while if it is over 40%, the crystallization behaviour is impaired to such an extent that processing, e.g. by injection moulding, becomes virtually impossible, and the melting point may rise too much. However, this last disadvantage can be remedied by the incorporation of units of a third polyamide that generally has a lower melting point.

The most preferred proportion to be incorporated has to be established in each individual case. The preferred proportion will generally be 2–30% and most preferably 7–25% for units derived from 1,4-cyclohexane-dicarboxylic acid or 1,4-cyclohexanediamine. The aliphatic diamine or dicarboxylic acid is generally the same as that in the repeating units from which the main chain is essentially made up.

The copolyamide to be used for making the electrical or electronic components according to the invention can be prepared by the conventional methods of copolycondensation. In these methods, a two-stage process is generally used, the first stage of which is the polycondensation of the starting dicarboxylic acids and diamines and, if desired, amino acids or lactams at an elevated pressure and at a temperature of about 200–280° C., possibly in the presence of a polycondensation catalyst. If desired, the monomers can be used in the form of the corresponding nylon salts. The pressure is generally kept between approximately 1–2 MPa, and the water formed in the polycondensation is removed. After a reaction time of 0.5–3 h, the pressure is released and the temperature is raised, so that the resulting low-molecular copolyamide remains in the melt. The condensation of the melt is then completed over a period of 2–5 h under vacuum at a temperature above the melting point of the copolyamide, if desired under a nitrogen blanket.

This post-condensation is generally conducted over a long enough period to obtain a copolyamide with a sufficiently high molecular weight for the injection moulding of electrical and electronic components. In this case, it is generally desirable to reach a viscosity number (VN) of at least 150 ml/g, more preferably at least 170 ml/g and most preferably 200 ml/g. This ensures that the viscosity number of the processed component is at least 90 ml/g, more preferably at least 120 ml/g and most preferably at least 140 ml/g. The viscosity number is determined by the method specified in International Standard ISO No. 307, using a solution of 0.5 g of the sample in 100 ml of a 90 wt-% formic acid solution. The post-condensation can also be carried out in the solid phase, instead of in the melt phase as above, using an inert gas atmosphere, if desired under vacuum and/or in the presence of water vapour. The required period for the post-condensation then varies from about 5 to about 60 h, depending on the required viscosity number. The duration of post-condensation in this case also depends on the temperature, which is between about 200° C. and at a value about 10° C. below the melting point of the copolyamide. The required reaction time also depends on any catalyst that might be present. Suitable conventional polycondensation catalysts are e.g. phosphoric acid, boric acid, triphenyl phosphite and substituted phenyl phosphates.

The copolyamide can also be prepared from the individual homo-polyamides which are obtained by reacting in each case one diamine and one dicarboxylic acid in a polycondensation reaction. Mixing the homo-polyamides in the melt gives a block copolyamide or a random copolyamide, depending on the duration of the mixing process.

When low-molecular homo-copolyamides are used, it is best to subject the composition obtained after the mixing operation in the melt to a post-condensation step in the solid phase. This is preferably carried out in an inert gas atmosphere (i.e. in the absence of oxygen) at a reduced pressure.

However, this method of preparing the copolyamide has the disadvantage that, in a number of cases, the homo-polyamide based on the 1,4-cyclohexane-dicarboxylic acid has a very high melting point, so that processing with a standard apparatus can cause problems for mixing in the melt state. It may therefore be desirable to start instead with the monomers of the polyamide based on the 1,4-cyclohexanedicarboxylic acid or 1,4-cyclohexanediamine and the other homo-polyamide.

If desired, the polyamide composition can also contain the customary additives normally used with polyamides, e.g. stabilizers, colorants, processing aids (e.g. release agents), flame retarders, fillers and reinforcing materials such as glass fibres. The latter are generally used in an amount of 10–50 wt-%, based on the total composition. To increase the dimensional stability of the electrical or electronic components, a combination of a mineral filler and a fibrous reinforcing agent is used in many cases.

The electrical or electronic components according to the invention are prepared from the above compositions with the aid of the customary techniques, e.g. by injection moulding.

The following examples serve to explain the invention in more detail without limiting its scope.

Example I

Preparation of a copolymer of polyamide-4,6 and cyclohexanedicarboxylic acid. The following chemicals were used for the preparation:

cyclohexanedicarboxylic acid[1]) with a cis/trans ratio of 80:20, made by the Eastman Company adipic acid made by Aldrich diaminobutane in the form of an aqueous approximately 80 wt-% solution, made by Koey, JP.

These chemicals were used without any further purification.

363.62 g of the diaminobutane solution (81.70 wt-% in water), 400.0 g of adipic acid and 100 g of cyclohexanedicarboxylic acid were dissolved in 584.42 g of demineralized water in a 2.4-litre reactor under a nitrogen atmosphere. When all the solids had dissolved, the reactor was slowly heated to 165° C., while keeping the pressure in it at 0.2 MPa. Water was distilled off between 120 and 165° C. As soon as 589.67 ml of water had been collected, the reactor was closed, and the temperature of the reaction mixture was raised to 205° C. and kept at this value and at a pressure of 1.2 MPa for 30 min. The contents of the reactor were then flashed into a receiving vessel that was kept under a nitrogen atmosphere.

The prepolymer obtained in this process was ground and then subjected to post-condensation for 48 h at 250° C. in an atmosphere consisting of a 25;75 mixture of steam and nitrogen. The resulting white post-condensate had a viscosity number (VN) of 248 ml/g, measured on a solution of 0.5 g in 100 ml of 90 wt-% formic acid at 25° C. as described in International Standard ISO No. 307. The material obtained had a melting point of 314–316° C.

The other compositions involved in the Examples were synthesized in the same way, but with different ratios between the adipic acid and the cyclohexanedi-carboxylic acid, as well as with different post-condensation times.

In the case of the polyamide-6,6 copolyamide, the diaminobutane was replaced by diaminohexane.

A small (about 1 wt-%) excess of diamine was present in all the preparations.

1) Compositions made with either 100% trans or 100% cis instead of the 80/20 cis/trans cyclohexanedicarboxylic acid exhibit corresponding properties.

Example II

Copolyamides with various compositions were prepared by using the method described in Example I.

These materials were made into test specimens (ISO R 527, type 1A) by injection moulding, and several of their characteristics were determined. The injection moulding was carried out with the aid of a 22-mm Arburg Allrounder apparatus, operating with a fixed temperature of 325° C. over the cylinder and cooling at the feed section. The temperature of the die and the melt were 120 and about 330° C., respectively.

Mechanical properties

| Tensile tests (ISO R 537) | Polyamide-4,6 | Copolyamide-4,6 (80:20, see Example 1) |
| --- | --- | --- |
| Modulus of elasticity, MPa | 3102 | 3603 |
| Tensile strength, MPa | 83 | 103 |
| Elongation at break, % | 33 | 11 |

It is surprising that the copolyamide had a considerably higher modulus of elasticity, because differential scanning calorimetry (DSC) indicated a lower crystallinity and a lower heat of melting for it than for the polyamide-4,6 homopolymer, so that a lower rigidity would be expected for the copolyamide.

The infrared solder resistance was determined by exposing the small test plates to a certain temperature for a certain time (temperature/time profile). The temperature of the specimen was raised from room temperature to the test temperature in about 200 sec, then held at this highest value for about 25–50 sec, and then cooled to room temperature in the course of about 60 sec.

FIG. 1 shows some typical examples of such temperature profiles, which are representative of the practical conditions occurring during infrared soldering. The test specimens subjected to this test immediately after injection moulding showed no blister formation at temperatures of up to 275° C.

Table 1 shows the results obtained for test specimens (UL 94, VB 0.8 mm) after conditioning at 35° C. and at a relative humidity of 90% until equilibrium had been reached.

It is interesting to note that the copolyamide compositions did not show a significantly lower water uptake than the homo-polyamide and yet only started exhibiting blister formation at a 20–30° C. higher temperature.

TABLE 1

(CHDC = cyclohexanedicarboxylic acid)

| Composition | Moisture uptake [wt %] | Blistering temperature, ° C. | Viscosity number of the specimen |
| --- | --- | --- | --- |
| Polyamide-4,6 | 8.4 | 240 | 170 |
| 80:20 mixture of polyamide-4,6 and CHDC | 9.1 | 270 | 208 |
| Same | 9.0 | 260 | 147 |
| Polyamide-4,6 with glass fibre | 8.2 | 220 | 99 |
| Polyamide-4,6/CHDC with glass fibre | 9.1 | 240 | 99 |

Note
"Polyamide-4,6 with glass firbe" was a polyamide-4,6 composition containing 30 wt-% of glass fibres and 25 wt-% of a flame retarder )a 3:1 mixture of polybromostyrene and antimony trioxide)

TABLE 1-continued (CHDC = cyclohexanedicarboxylic acid)

| Composition | Moisture uptake [wt %] | Blistering temperature, ° C. | Viscosity number of the specimen |
| --- | --- | --- | --- |

"Polyamide-4,6/CHDC with glass fibre" was a material with the same composition but prepared from an 80:20 copolyamide mixture with cyclohexanedicarboxy acid.

Table 2 presents more data on different compositions of copolyamides. the blistering onset temperatures are given for conditioned test specimens.

TABLE 2

| Composition | Moisture uptake [wt %] | Viscosity number of specimen | Melting temperature [° C.] | Blistering temperature [° C.] |
| --- | --- | --- | --- | --- |
| 4.6/CHD |  |  |  |  |
| 95/5 | 9.2 | 246 | 299 | 260 |
| 90/10 | 9.2 | 252 | 305 | 265 |
| 80/20 | 8.9 | 165 | 324 | 270 |
| 80/20 + 5Cl | 8.5 | 170 | 321 | 270 |
| 80/20 + 10Cl | 9.5 | 256 | 316 | 270 |
| 6.6 CHD |  |  |  |  |
| 95/5 |  |  | 266 |  |
| 90/10 |  |  | 274 |  |
| 80/20 |  |  | 287 |  |
| 70/30 | 5.1 |  | 298 | 250 |
| 60/40 | 5.1 |  | 307 | 250 |

80/20+5Cl means a composition in which 20% (wt) of the adipicacid is replacing by cyclohexanedicarboxylic acid and 5% (wt) of caprolactam is copolymerised.

From the data of Table 2 one may also conclude that the copolyamides of polyamide 6.6 in which at least 20 wt % of the adipicacid has been replaced by cyclohexanedicarboxylicacid has a melting temperature that is sufficiently high for use in SMT applications and an improved blistering behaviour compared to polyamide 4.6.

We claim:

1. An electrical or electronic component made from a polyamide composition, wherein the polyamide therein has a main chain, said main chain of the polyamide consisting essentially of units derived from aliphatic dicarboxylic acids and aliphatic diamines or α,ω-amino acids, wherein from 1 to about 40% of the number of chain units are derived from 1,4-cyclohexanedicarboxylic acid and an aliphatic diamine, or from 1,4-and an aliphatic dicarboxylic acid.

2. An electrical or electronic component according to claim 1, wherein the aliphatic dicarboxylic acids contain 2–16 methyl groups, and the aliphatic diamines contain 4–16 methyl groups.

3. An electrical or electronic component according to claim 1 or 2, wherein 2–30% of the number of chain units are derived from 1,4-cyclohexane-dicarboxylic acid or 1,4-cyclohexanediamine.

4. An electrical or electronic component according to claim 3, wherein 7–25% of the number of chain units are derived from 1,4-cyclohexanedicarboxylic acid or 1,4-cyclohexanediamine.

5. An electrical or electronic component according to claims 1 or 2, wherein the aliphatic dicarboxylic acid is adipic acid, and the aliphatic diamine is 1,6-hexamethylenediamine, 1,4-tetramethylenediamine, or a mixture thereof.

6. An electrical or electronic component according to claim 5, wherein the main chain includes units derived from an α,ω-amino acid.

7. An electrical or electronic component according to claim 6, wherein the α,ω-amino acid is selected from the group consisting of 6-aminocaproic acid, 11-aminoundecanoic acid and 12-aminododecanoic acid.

8. An electrical or electronic component according to claim 1 or 2, wherein the viscosity number of the copolyamide in the component is at least 90 ml/g, as determined on a solution of 0.5 g in 100 ml of 90% formic acid at 25° C. by the method described in ISO 307.

9. An electrical or electronic component according to claim 8, wherein the viscosity number of the copolyamide is at least 120 ml/g.

10. An electrical or electronic component according to claim 1, wherein said component is adapted for installation on a circuit board and is capable of being installed by surface mounting to the circuit board.

11. A copolyamide consisting essentially of chain units derived from 1,4-tetramethylenediamine and adipic acid, wherein 1–40% of the chain units are derived from 1,4-tetramethylenediamine and 1,4 cyclohexanedicarboxylic acid, or from adipic acid and 1,4-cyclohexyldiamine.

* * * * *